United States Patent
Zhang

(10) Patent No.: US 12,469,883 B2
(45) Date of Patent: Nov. 11, 2025

(54) ELECTROLYTE, ELECTROCHEMICAL APPARATUS, AND ELECTRONIC APPARATUS

(71) Applicant: Ningde Amperex Technology Limited, Ningde (CN)

(72) Inventor: Yafei Zhang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 815 days.

(21) Appl. No.: 17/709,661

(22) Filed: Mar. 31, 2022

(65) Prior Publication Data
US 2022/0223916 A1 Jul. 14, 2022

Related U.S. Application Data

(63) Continuation of application No. PCT/CN2020/137947, filed on Dec. 21, 2020.

(51) Int. Cl.
H01M 10/0568 (2010.01)
H01M 4/02 (2006.01)
(Continued)

(52) U.S. Cl.
CPC ....... H01M 10/0568 (2013.01); H01M 4/382 (2013.01); H01M 4/386 (2013.01);
(Continued)

(58) Field of Classification Search
CPC .. H01M 10/0568; H01M 4/382; H01M 4/386; H01M 10/0525; H01M 2004/027;
(Continued)

(56) References Cited

U.S. PATENT DOCUMENTS

2007/0281209 A1* 12/2007 Kishi ............... H01M 10/0569
429/188
2019/0237803 A1* 8/2019 Gerasopoulos ... H01M 10/0525
(Continued)

FOREIGN PATENT DOCUMENTS

CN 101853959 A 10/2010
CN 102948001 B 9/2015
(Continued)

OTHER PUBLICATIONS

International Search Report and Written Opinion for Application No. PCT/CN2020/137947 mailed on Nov. 26, 2021.

*Primary Examiner* — Ula C Ruddock
*Assistant Examiner* — Sarika Gupta
(74) *Attorney, Agent, or Firm* — Maier & Maier, PLLC

(57) ABSTRACT

An electrolyte includes a fluorine-containing lithium salt and lithium dicyanamide, and the fluorine-containing lithium salt includes lithium fluorosulfonyl(trifluoromethanesulfonyl)imide. According to embodiments of this application, the electrolyte is improved, so that a lithium salt includes the lithium fluorosulfonyl(trifluoromethanesulfonyl)imide and the lithium dicyanamide, thereby helping to enhance stability of a solid electrolyte interface (SEI) film of a negative electrode. In this way, cycling performance of the electrochemical apparatus is improved, and dynamic performance of the electrolyte is basically not affected.

15 Claims, 1 Drawing Sheet

(51) Int. Cl.
*H01M 4/38* (2006.01)
*H01M 10/0525* (2010.01)

(52) U.S. Cl.
CPC .. *H01M 10/0525* (2013.01); *H01M 2004/027* (2013.01); *H01M 2300/0025* (2013.01)

(58) Field of Classification Search
CPC . H01M 2300/0025; H01M 2300/0034; H01M 2300/0045; H01M 10/0567; H01M 10/0569; H01M 10/4235; Y02E 60/10
See application file for complete search history.

(56) References Cited

U.S. PATENT DOCUMENTS

| | | | |
|---|---|---|---|
| 2019/0355963 A1 | 11/2019 | Singh et al. | |
| 2020/0161706 A1* | 5/2020 | Cao | H01M 10/0568 |
| 2021/0257609 A9* | 8/2021 | Zimmerman | H01M 10/0565 |

FOREIGN PATENT DOCUMENTS

| | | |
|---|---|---|
| CN | 106169610 A | 11/2016 |
| CN | 109361017 A | 2/2019 |
| CN | 110416597 A | 11/2019 |

\* cited by examiner

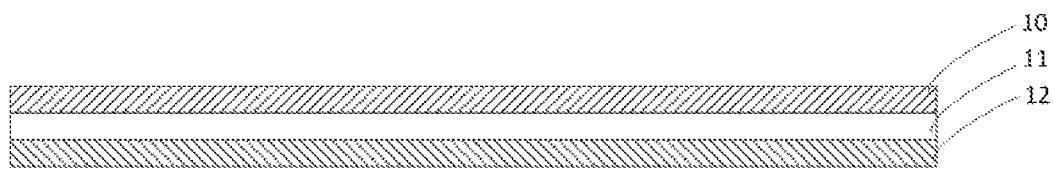

ELECTROLYTE, ELECTROCHEMICAL APPARATUS, AND ELECTRONIC APPARATUS

CROSS-REFERENCE TO RELATED APPLICATIONS

This application is a Continuation of International Application: PCT/CN2020/137947 filed on Dec. 21, 2020, the whole disclosure of which is incorporated herein by reference.

TECHNICAL FIELD

This application relates to the electrochemical energy storage field, and in particular, to an electrolyte, an electrochemical apparatus, and an electronic apparatus.

BACKGROUND

With the development and advancement of electrochemical apparatuses (for example, lithium-ion batteries), increasing requirements are imposed on cycling performance of electrochemical apparatuses. Although current technologies for improving electrochemical apparatuses can enhance cycling performance of electrochemical apparatuses to some extent, the current technologies are not satisfactory, and further improvements are expected.

SUMMARY

An embodiment of this application provides an electrolyte including a lithium salt. The lithium salt includes a fluorine-containing lithium salt and lithium dicyanamide, and the fluorine-containing lithium salt includes lithium fluorosulfonyl(trifluoromethanesulfonyl)imide.

In some embodiments, a total molar concentration of the fluorine-containing lithium salt and the lithium dicyanamide contained in the electrolyte is 0.9 mol/L to 3.0 mol/L. In some embodiments, a molar concentration of the fluorine-containing lithium salt contained in the electrolyte is 0.8 mol/L to 2.0 mol/L. In some embodiments, the fluorine-containing lithium salt is lithium fluorosulfonyl(trifluoromethanesulfonyl)imide. In some embodiments, a molar concentration of the lithium fluorosulfonyl(trifluoromethanesulfonyl)imide contained in the electrolyte is 1.5 mol/L to 2.0 mol/L. In some embodiments, a molar concentration of the lithium dicyanamide contained in the electrolyte ranges from 0.1 mol/L to 1.1 mol/L.

In some embodiments, the fluorine-containing lithium salt further includes lithium hexafluorophosphate. In some embodiments, the fluorine-containing lithium salt further includes at least one of lithium tetrafluoroborate, lithium hexafluoroarsenate, lithium perchlorate, lithium difluorophosphate, lithium bisfluorosulfonylimide, or a bistrifluoromethanesulfonimide lithium salt.

In some embodiments, a molar concentration of the lithium fluorosulfonyl(trifluoromethanesulfonyl)imide contained in the electrolyte is greater than or equal to a molar concentration of the lithium hexafluorophosphate contained in the electrolyte.

In some embodiments, the electrolyte further includes an additive, and the additive includes fluoroethylene carbonate. In some embodiments, the additive further includes at least one of vinylene carbonate, 1,3-propanesultone, ethylene sulfate, methylene methanedisulfonate, or lithium bis(oxalate)borate.

Another embodiment of this application provides an electrochemical apparatus, including: a positive electrode plate, where the positive electrode plate includes a positive electrode active material; a negative electrode plate, where the negative electrode plate includes a negative electrode active material; a separator disposed between the positive electrode plate and the negative electrode plate; and an electrolyte, where the electrolyte is the electrolyte according to any one of the foregoing embodiments.

In some embodiments, the negative electrode active material includes at least one of a lithium metal or a silicon-based material. In some embodiments, the silicon-based material includes at least one of silicon, a silicon-oxygen compound, a silicon-carbon compound, or a silicon alloy.

In some embodiments, a mass percentage of a silicon element contained in the silicon-based material is greater than or equal to 10%, and a molar concentration of lithium fluorosulfonyl(trifluoromethanesulfonyl)imide contained in the electrolyte is 0.8 mol/L to 2.0 mol/L.

In some embodiments, a mass percentage of a silicon element contained in the silicon-based material is greater than or equal to 40%, and a molar concentration of lithium fluorosulfonyl(trifluoromethanesulfonyl)imide contained in the electrolyte is 1.1 mol/L to 2.0 mol/L.

An embodiment of this application further provides an electronic apparatus, including the foregoing electrochemical apparatus.

According to the embodiments of this application, the electrolyte is improved, so that the lithium salt includes the lithium fluorosulfonyl(trifluoromethanesulfonyl)imide and the lithium dicyanamide, thereby helping to enhance stability of a solid electrolyte interface (SEI) film of a negative electrode. In this way, cycling performance of the electrochemical apparatus is improved, and relatively good dynamic performance of the electrolyte can also be ensured.

BRIEF DESCRIPTION OF DRAWINGS

FIGURE shows a schematic diagram of an electrode assembly of an electrochemical apparatus according to an embodiment of this application.

DETAILED DESCRIPTION

The following embodiments may help a person skilled in the art to understand this application more comprehensively, but do not limit this application in any way.

An important means of improving cycling performance of an electrochemical apparatus is enhancing stability of a negative electrode SEI film. Currently, stability of a negative electrode SEI film may be enhanced by adding fluoroethylene carbonate (FEC) to an electrolyte. However, FEC is decomposed on a negative electrode surface to generate HF and $H_2$, and this reaction is accelerated especially when a lithium salt in the electrolyte is $LiPF_6$ and $H_2O$ is present. Generation of HF degrades a cathode electrolyte interphase (CEI) film of a positive electrode, and reduces cycling performance of an electrochemical apparatus at high temperature. Therefore, enhancing an SEI film by increasing a concentration of a negative electrode film forming additive FEC contained in an electrolyte has a specific limitation.

An embodiment of this application provides an electrolyte. The electrolyte includes a fluorine-containing lithium salt and lithium dicyanamide (LiDCA), and the fluorine-containing lithium salt includes lithium fluorosulfonyl(trifluoromethanesulfonyl)imide (LiFTFSI). An anion FTFSI⁻ in the lithium fluorosulfonyl(trifluoromethanesulfonyl)imide (LiFTFSI) is as follows:

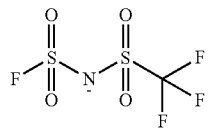

An anion DCA⁻ in the lithium dicyanamide (LiDCA) is as follows:

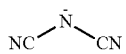

In some embodiments, the fluorine-containing lithium salt is lithium fluorosulfonyl(trifluoromethanesulfonyl)imide (LiFTFSI).

In this application, the LiFTFSI is used for the fluorine-containing lithium salt. The LiFTFSI is a fluorine-containing film forming additive, and can react (for example, with a silicon-based material or lithium metal of a negative electrode active material) on a negative electrode surface, thereby facilitating formation of a complete and strong SEI film. Moreover, compared with $LiPF_6$, anion charges of the LiFTFSI are less concentrated, and electronegativity of the LiFTFSI is high, so that a concentration of an inorganic constituent (for example, LiF) contained in the formed SEI film is larger. Furthermore, the LiFTFSI and lithium ions have a strong dissociation capability, which facilitates quick formation of the SEI film, and can increase ionic conductivity of lithium ions in the electrolyte. In addition, dissolving the LiDCA in the electrolyte has relatively small impact on viscosity of the electrolyte. Therefore, matching the LiFTFSI with the LiDCA can effectively reduce impact of an increased lithium salt concentration on the viscosity of the electrolyte, and improve dynamic performance of the electrolyte. Moreover, a lithium salt includes the LiFTFSI and the LiDCA, thereby improving stability of FEC in the electrolyte and reducing damage to the CEI film caused by generation of HF, so that cycling performance of an electrochemical apparatus is improved.

In some embodiments, a total molar concentration of the lithium fluorosulfonyl(trifluoromethanesulfonyl)imide and the lithium dicyanamide contained in the electrolyte is 0.9 mol/L to 3.0 mol/L. If the molar concentration of the lithium fluorosulfonyl(trifluoromethanesulfonyl)imide and the lithium dicyanamide is excessively large, for example, greater than 3.0 mol/L, lithium salt precipitation may occur due to an excessively high lithium salt concentration, and costs of the electrolyte are increased. If the molar concentration of the lithium fluorosulfonyl(trifluoromethanesulfonyl)imide and the lithium dicyanamide is excessively small, for example, less than 0.9 mol/L, this is not conducive to lithiation of the electrochemical apparatus at a late stage of cycling, and electrical conductivity of the electrolyte is reduced.

In some embodiments, a molar concentration of the lithium fluorosulfonyl(trifluoromethanesulfonyl)imide contained in the electrolyte is greater than or equal to 0.8 mol/L and less than 2.0 mol/L. If the molar concentration of the lithium fluorosulfonyl(trifluoromethanesulfonyl)imide is excessively large, for example, greater than 2.0 mol/L, lithium salt precipitation may occur due to an excessively high lithium salt concentration, and costs of the electrolyte are increased; in addition, because viscosity of a lithium fluorosulfonyl(trifluoromethanesulfonyl)imide solution is relatively high, an excessively large concentration of the lithium fluorosulfonyl(trifluoromethanesulfonyl)imide also decreases a lithium ion transmission rate, and as a result, dynamic performance of the electrolyte is reduced. If the molar concentration of the lithium fluorosulfonyl(trifluoromethanesulfonyl)imide is excessively small, for example, less than 0.8 mol/L, an SEI film stability improvement function of the lithium fluorosulfonyl(trifluoromethanesulfonyl)imide is not obvious.

In some embodiments, the fluorine-containing lithium salt further includes M, and the M includes at least one of lithium hexafluorophosphate, lithium tetrafluoroborate, lithium hexafluoroarsenate, lithium perchlorate, lithium difluorophosphate, lithium bisfluorosulfonylimide, or a bistrifluoromethanesulfonimide lithium salt. Therefore, the lithium salt in the electrolyte in this application may include only the lithium fluorosulfonyl(trifluoromethanesulfonyl)imide and the lithium dicyanamide, or may further include a suitable fluorine-containing lithium salt described above.

In some embodiments, the M includes lithium hexafluorophosphate.

In some embodiments, a total molar concentration of the lithium fluorosulfonyl(trifluoromethanesulfonyl)imide, the lithium dicyanamide, and the M contained in the electrolyte is 0.9 mol/L to 3.0 mol/L. If the molar concentration of the lithium fluorosulfonyl(trifluoromethanesulfonyl)imide, the lithium dicyanamide, and the M is excessively large, for example, greater than 3.0 mol/L, lithium salt precipitation may occur due to an excessively high lithium salt concentration, and costs of the electrolyte are increased. If the molar concentration of the lithium fluorosulfonyl(trifluoromethanesulfonyl)imide, the lithium dicyanamide, and the M is excessively small, for example, less than 0.9 mol/L, this is not conducive to lithiation of the electrochemical apparatus at a late stage of cycling, and electrical conductivity of the electrolyte may be reduced.

In some embodiments, a total molar concentration of the lithium fluorosulfonyl(trifluoromethanesulfonyl)imide and the M, namely, the fluorine-containing lithium salt, contained in the electrolyte is 0.8 mol/L to 2.0 mol/L. If the molar concentration of the lithium fluorosulfonyl(trifluoromethanesulfonyl)imide and the M contained in the electrolyte is excessively large, for example, greater than 2.0 mol/L, because viscosity of a solution of the lithium fluorosulfonyl(trifluoromethanesulfonyl)imide and the M is relatively high, an excessively large concentration of the lithium fluorosulfonyl(trifluoromethanesulfonyl)imide and the M also reduces dynamic performance of the electrolyte and increases a cost of the electrolyte. If the molar concentration of the lithium fluorosulfonyl(trifluoromethanesulfonyl)imide and the M contained in the electrolyte is excessively small, for example, less than 0.8 mol/L, an SEI film stability improvement function of the lithium fluorosulfonyl (trifluoromethanesulfonyl)imide is weaker; in addition, the fluorine-containing lithium salt contained in the electrolyte needs to be kept in a specific molar concentration to form a stable SEI film on the negative electrode surface, in other words, a molar concentration of the fluorine-containing lithium salt contained in the electrolyte needs to be ensured.

In some embodiments, a molar concentration of the M contained in the electrolyte is less than or equal to a molar concentration of the lithium fluorosulfonyl(trifluoromethanesulfonyl)imide contained in the electrolyte. To be specific, for the fluorine-containing lithium salt in the electrolyte, a ratio of the molar concentration of the lithium fluorosulfonyl(trifluoromethanesulfonyl)imide contained in the electrolyte to a molar concentration of the fluorine-containing lithium salt contained in the electrolyte is greater than or equal to 50% and less than 100%. If a percentage of the molar concentration of the M is excessively large, for example, the molar concentration of the M is greater than the molar concentration of the lithium fluorosulfonyl(trifluoromethanesulfonyl)imide, the molar concentration of the lithium fluorosulfonyl(trifluoromethanesulfonyl)imide is excessively small, and as a result, an SEI film stability improvement function of the lithium fluorosulfonyl(trifluoromethanesulfonyl)imide is limited.

In some embodiments, a molar concentration of the lithium fluorosulfonyl(trifluoromethanesulfonyl)imide contained in the electrolyte is greater than or equal to a molar concentration of the lithium hexafluorophosphate contained in the electrolyte.

In some embodiments, the electrolyte further includes an additive, and the additive includes at least one of fluoroethylene carbonate, vinylene carbonate, 1,3-propanesultone, ethylene sulfate, methylene methanedisulfonate, or lithium bis(oxalate)borate. In some embodiments, the additive is fluoroethylene carbonate. The fluoroethylene carbonate can enhance stability of the negative electrode SEI film.

In some embodiments, the additive is fluoroethylene carbonate, and the lithium fluorosulfonyl(trifluoromethanesulfonyl)imide helps to enhance stability of the fluoroethylene carbonate in the electrolyte.

In some embodiments, the electrolyte further includes a non-aqueous solvent, and the non-aqueous solvent may be a carbonate compound, a carboxylate compound, an ether compound, another organic solvent, or a combination thereof.

The carbonate compound may be a linear carbonate compound, a cyclic carbonate compound, a fluorocarbonate compound, or a combination thereof.

An instance of the linear carbonate compound is diethyl carbonate (DEC), dimethyl carbonate (DMC), dipropyl carbonate (DPC), methyl propyl carbonate (MPC), ethyl propyl carbonate (EPC), methyl ethyl carbonate (MEC), or a combination thereof. An instance of the cyclic carbonate compound is ethylene carbonate (EC), propylene carbonate (PC), butylene carbonate (BC), vinyl ethylene carbonate (VEC), or a combination thereof. An instance of the fluorocarbonate compound is fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, or a combination thereof.

An instance of the carboxylate compound is methyl acetate, ethyl acetate, n-propyl acetate, tert-butyl acetate, methyl propionate, ethyl propionate, propyl propionate, γ-butyrolactone, decanolide, valerolactone, mevalonolactone, caprolactone, methyl formate, or a combination thereof.

An instance of the ether compound is dibutyl ether, tetraglyme, diglyme, 1,2-dimethoxyethane, 1,2-diethoxyethane, ethoxymethoxy ethane, 2-methyltetrahydrofuran, tetrahydrofuran, or a combination thereof.

An instance of the another organic solvent is dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or a combination thereof.

As shown in FIGURE, a schematic diagram of an electrochemical apparatus according to this application is provided. The electrochemical apparatus includes a positive electrode plate 10, a negative electrode plate 12, a separator 11 disposed between the positive electrode plate 10 and the negative electrode plate 12, and an electrolyte. In some embodiments, the electrolyte is the electrolyte described above. In some embodiments, the positive electrode plate 10 includes a positive electrode active material. In some embodiments, the negative electrode plate 12 includes a negative electrode active material.

In some embodiments, the negative electrode plate 12 may include a negative electrode current collector and a negative electrode active material layer disposed on the negative electrode current collector. The negative electrode active material layer may be disposed on one side or two sides of the negative electrode current collector. In some embodiments, for the negative electrode current collector, at least one of a copper foil, a nickel foil, or a carbon-based current collector may be used. In some embodiments, the negative electrode active material layer may include a negative electrode active material. In some embodiments, the negative electrode active material in the negative electrode active material layer includes at least one of a lithium metal or a silicon-based material. In some embodiments, the silicon-based material includes at least one of silicon, a silicon-oxygen compound, a silicon-carbon compound, or a silicon alloy.

In some embodiments, a mass percentage of a silicon element contained in the silicon-based material is greater than or equal to 10%, and a molar concentration of lithium fluorosulfonyl(trifluoromethanesulfonyl)imide contained in the electrolyte is 0.8 mol/L to 2.0 mol/L. The silicon-based material has a large capacity per gram, and therefore has a wide application prospect in electrochemical apparatuses. When a mass percentage of the silicon element in the silicon-based material is relatively large, side reactions between some substances (for example, an additive FEC) in the electrolyte and the silicon-based material are increased. Therefore, such side reactions may be mitigated by using a relatively large molar concentration (for example, more than 0.8 mol/L) of lithium fluorosulfonyl(trifluoromethanesulfonyl)imide, so as to improve stability of a negative electrode SEI film. However, an excessively large molar concentration of the lithium fluorosulfonyl(trifluoromethanesulfonyl)imide is not conducive to dynamic performance of the electrolyte.

In some embodiments, a mass percentage of a silicon element contained in the silicon-based material is greater than or equal to 40%, and a molar concentration of lithium fluorosulfonyl(trifluoromethanesulfonyl)imide contained in the electrolyte is 1.1 mol/L to 2.0 mol/L. As described above, when a mass percentage of the silicon element in the silicon-based material is increased, for example, increased from above 10% to above 40%, side reactions between the electrolyte and the silicon-based material may be mitigated by increasing the molar concentration of the lithium fluorosulfonyl(trifluoromethanesulfonyl)imide (for example, increasing to above 1.1 mol/L), so as to improve stability of a negative electrode SEI film.

In some embodiments, the negative electrode active material layer may further include a conductive agent and/or a binder. The conductive agent in the negative electrode active material layer may include at least one of carbon black, acetylene black, Ketjen black, lamellar graphite, graphene, carbon nanotubes, carbon fibers, or carbon nanowires. In some embodiments, the binder in the negative electrode active material layer may include at least one of carboxymethyl cellulose (CMC), polyacrylic acid, a polyacrylic salt, polyacrylate, polyvinylpyrrolidone, polyaniline, polyimide, polyamideimide, silicone oil, styrene butadiene rubber, phenolic epoxy resin, polyester resin, polyurethane resin, or polyfluorene. It should be understood that the materials disclosed above are merely examples, and any other suitable material may be used for the negative electrode active material layer. In some embodiments, a mass ratio between the negative electrode active material, the conductive agent, and the binder in the negative electrode active material layer may be (80-99):(0.5-10):(0.5-10). It should be understood that this is merely an example and is not intended to limit this application.

In some embodiments, the positive electrode plate 10 includes a positive electrode current collector and a positive electrode active material layer disposed on the positive electrode current collector. The positive electrode active material layer may be located on one side or two sides of the positive electrode current collector. In some embodiments, an aluminum foil may be used for the positive electrode current collector. Certainly, other positive electrode current collectors commonly used in the art may also be used. In some embodiments, a thickness of the positive electrode current collector may be 1 μm to 200 μm. In some embodiments, the positive electrode active material layer may be applied on only part of the positive electrode current collector. In some embodiments, a thickness of the positive electrode active material layer may be 10 μm to 500 μm. It should be understood that this is merely an example, and any other suitable thickness may be used.

In some embodiments, the positive electrode active material layer includes a positive electrode active material. In some embodiments, the positive electrode active material may include at least one of lithium cobaltate, lithium manganate, lithium iron phosphate, lithium iron manganese phosphate, lithium nickel cobalt manganate, lithium nickel cobalt aluminate, or lithium nickel manganate, and the positive electrode active material may undergo doping and/or coating processing. In some embodiments, the positive electrode active material layer further includes a binder and a conductive agent. In some embodiments, the binder in the positive electrode active material layer may include at least one of polyvinylidene fluoride, vinylidene fluoride-hexafluoropropylene copolymer, styrene-acrylate copolymer, styrene-butadiene copolymer, polyamide, polyacrylonitrile, polyacrylic ester, polyacrylic acid, a polyacrylic salt, carboxyl methyl cellulose, polyvinyl acetate, polyvinylpyrrolidone, polyvinylether, polymethyl methacrylate, polytetrafluoroethylene, or polyhexafluoropropylene. In some embodiments, the conductive agent in the positive electrode active material layer may include at least one of conductive carbon black, acetylene black, Ketjen black, lamellar graphite, graphene, carbon nanotubes, or carbon fibers. In some embodiments, a mass ratio between the positive electrode active material, the conductive agent, and the binder in the positive electrode active material layer may be (70-98):(1-15):(1-15). It should be understood that the descriptions above are merely examples, and any other suitable material, thickness, and mass ratio may be used for the positive electrode active material layer.

In some embodiments, the separator 11 includes at least one of polyethylene, polypropylene, polyvinylidene fluoride, polyethylene terephthalate, polyimide, or aramid. For example, the polyethylene includes at least one selected from high-density polyethylene, low-density polyethylene, or ultra-high molecular weight polyethylene. In particular, the polyethylene and the polypropylene can well prevent a short circuit, and can improve stability of a battery through a turn-off effect. In some embodiments, a thickness of the separator is in a range from about 3 μm to 500 μm.

In some embodiments, a surface of the separator may further include a porous layer. The porous layer is disposed on at least one surface of the separator. The porous layer includes at least one of inorganic particles or a binder. The inorganic particles are selected from at least one of aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), cerium dioxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, pores of the separator have a diameter ranging from about 0.01 μm to 1 μm. The binder in the porous layer is selected from at least one of polyvinylidene fluoride, vinylidene fluoride-hexafluoropropylene copolymer, polyamide, polyacrylonitrile, polyacrylic ester, polyacrylic acid, a polyacrylic salt, carboxyl methyl cellulose, polyvinylpyrrolidone, polyvinyl ether, polymethyl methacrylate, polytetrafluoroethylene, or polyhexafluoropropylene. The porous layer on the surface of the separator can improve heat resistance, oxidation resistance, and electrolyte infiltration performance of the separator, and enhance adhesion between the separator and the electrode plate.

In some embodiments of this application, an electrode assembly of the electrochemical apparatus is a wound electrode assembly or a stacked electrode assembly. In some embodiments, the electrochemical apparatus is a lithium-ion battery, but this application is not limited thereto.

In some embodiments of this application, using the lithium-ion battery as an example, the positive electrode plate, the separator, and the negative electrode plate are wound or stacked in sequence to form the electrode assembly, then the electrode assembly is placed into, for example, an aluminum-plastic filmed housing for packaging, an electrolyte is injected, followed by formation and packaging, to obtain the lithium-ion battery. Then, performance testing is performed on the prepared lithium-ion battery.

A person skilled in the art will understand that the foregoing preparation method of the electrochemical apparatus (for example, the lithium-ion battery) is merely an embodiment. Without departing from the content disclosed in this application, other methods commonly used in the art may be used.

An embodiment of this application further provides an electronic apparatus including the foregoing electrochemical apparatus. The electronic apparatus according to this embodiment of this application is not particularly limited, and may be any known electronic apparatus used in the prior art. In some embodiments, the electronic apparatus may include but is not limited to a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notepad, a calculator, a memory card, a portable recorder, a radio, a standby power source, a motor, an automobile, a motorcycle, a power-assisted bicycle, a bicycle, a lighting appliance, a toy, a game console, a clock, an electric tool, a flash lamp, a camera, a large household battery, a lithium-ion capacitor, or the like.

Some specific Examples and Comparative Examples are listed below to better illustrate this application. A lithium-ion battery is used as an example for illustration.

Example 1

Preparation of a positive electrode plate: Lithium cobaltateare as a positive electrode active material, conductive carbon black as a conductive agent, and polyvinylidene fluoride as a binder are dissolved in an N-methylpyrrolidone (NMP) solution at a weight ratio of 96.5:1.5:2, to obtain positive electrode paste. An aluminum foil is used as a positive electrode current collector. The positive electrode paste is applied on the positive electrode current collector, and a weight of applied positive electrode paste is 17.2 mg/cm$^2$. After drying, cold pressing, and cutting, the positive electrode plate is obtained.

Preparation of a negative electrode plate: A negative electrode active material is a silicon-oxygen material ($SiO_x$) and graphite, and a capacity is 500 mAh/g. The negative electrode active material, polyacrylic acid, conductive carbon black, and carboxymethylcellulose sodium are dissolved in deionized water at a weight ratio of 92:5:2:1, to obtain negative electrode active material layer paste, where a weight percentage of silicon in a silicon-based material is 10%. A copper foil whose thickness is 10 μm is used as a negative electrode current collector. The negative electrode active material layer paste is applied on the negative electrode current collector, and a weight of applied negative electrode active material layer paste is 6.27 mg/cm$^2$. Drying is performed, so that water contained in the negative electrode plate is less than or equal to 300 ppm, to obtain a negative electrode active material layer. Cutting is performed to obtain the negative electrode plate.

Preparation of a separator: A polyethene (PE) base material 8 μm thick is used for the separator. A 2 μm alumina ceramic layer is applied on each of two sides of the separator, and finally, 2.5 mg/cm$^2$ polyvinylidene fluoride (PVDF) is applied on each of the two sides of the separator coated with the ceramic layer, and is dried.

Preparation of an electrolyte: In an environment with a moisture content less than 10 ppm, a lithium salt is mixed with non-aqueous organic solvents (ethylene carbonate (EC), diethyl carbonate (DEC), propylene carbonate (PC), polypropylene (PP), and vinylene carbonate (VC) at a weight ratio of 20:30:20:28:2), to obtain the electrolyte. For specific proportions, refer to data in a table.

Preparation of a lithium-ion battery: The positive electrode plate, the separator, and the negative electrode plate are stacked in sequence, so that the separator is disposed between the positive electrode plate and the negative electrode plate for separation, and the positive electrode plate, the separator, and the negative electrode plate are wound to obtain an electrode assembly. The electrode assembly is placed in an outer packing aluminum-plastic film, and is dehydrated at 80° C. Then, the foregoing electrolyte is injected, and packaging is performed, followed by processes such as chemical conversion, degassing, and trimming to obtain the lithium-ion battery.

For other Examples and Comparative examples, parameters are changed based on the steps in Example 1, and specific changed parameters are shown in tables below.

The following describes testing methods for various parameters in this application.

Cycling Performance Test

In a 25° C.±2° C. or 45° C.±2° C. thermostatic bath, the lithium-ion battery is charged to 4.45 V at a 0.5 C constant current, and then is charged to 0.05 C at a 4.45 V constant voltage, and is left to stand for 15 minutes; then, the lithium-ion battery is discharged to 3.0 V at the 0.5 C constant current, and is left to stand for 5 minutes. This is a process of one charge and discharge cycle. A capacity of the first discharge is taken as 100%. The charge and discharge cycle process is repeated, and a quantity of cycles completed when cycling capacity retention is 80% is recorded as an indicator for evaluating cycling performance of the lithium-ion battery.

Table 1 shows parameters and evaluation results in Examples 1 and 2 and Comparative Example 1.

TABLE 1

| No. | Concentration of $LiPF_6$ (mol/L) | Concentration of LiFTFSI (mol/L) | Concentration of LiDCA (mol/L) | Mass percentage of an additive FEC | Quantity of cycles completed when capacity retention is 80% (at 45° C.) | Quantity of cycles completed when capacity retention is 80% (at 25° C.) |
|---|---|---|---|---|---|---|
| Comparative Example 1 | 1.15 | — | — | 10% | 480 | 615 |
| Example 1 | — | 1.0 | 0.15 | 10% | 610 | 708 |
| Example 2 | 0.2 | 0.8 | 0.15 | 10% | 650 | 745 |

Through comparison between Examples 1 and 2 and Comparative Example 1, it can be learned that when LiFTFSI and LiDCA are used as lithium salt, a quantity of cycles completed when capacity retention of the lithium-ion battery is 80% is increased compared with Comparative Example 1 in which neither LiFTFSI nor LiDCA is used; in other words, cycling performance is better. In addition, when LiFTFSI partially replaces $LiPF_6$, cycling performance is better.

Table 2 shows parameters and evaluation results in Examples 3 to 5 and Comparative Examples 2 and 3.

TABLE 2

| No. | Concentration of LiFTFSI (mol/L) | Concentration of LiDCA (mol/L) | Mass percentage of an additive FEC | Quantity of cycles completed when capacity retention is 80% (at 45° C.) | Quantity of cycles completed when capacity retention is 80% (at 25° C.) |
|---|---|---|---|---|---|
| Comparative Example 2 | 0.5 | 0.2 | 10% | 430 | 590 |
| Comparative Example 3 | 1.2 | 2.0 | 10% | 460 | 610 |
| Example 3 | 0.8 | 0.1 | 10% | 595 | 690 |
| Example 4 | 0.9 | 0.2 | 10% | 605 | 705 |
| Example 5 | 1.5 | 1.1 | 10% | 630 | 720 |

Through comparison between Comparative Examples 2 and 3 and Examples 3 to 5, it can be learned that when lithium fluorosulfonyl(trifluoromethanesulfonyl)imide and lithium dicyanamide exist as separate lithium salt, cycling performance of the lithium-ion battery is relatively good when a total molar concentration of the lithium fluorosulfonyl(trifluoromethanesulfonyl)imide and the lithium dicyanamide contained in the electrolyte is 0.9 mol/L to 3.0 mol/L. In other words, cycling performance in Examples 3 to 5 is better than that in Comparative Examples 2 and 3. Further, in Examples 3 to 5, when a concentration of the lithium fluorosulfonyl(trifluoromethanesulfonyl)imide contained in the electrolyte is greater than or equal to 0.8 mol/L, with the increase of the concentration of the lithium fluorosulfonyl (trifluoromethanesulfonyl)imide contained in the electrolyte, cycling performance of the lithium-ion battery is better.

Table 3 shows parameters and evaluation results in Examples 6 to 10.

TABLE 3

| No. | Concentration of LiPF6 (mol/L) | Concentration of LiFTFSI (mol/L) | Concentration of LiDCA (mol/L) | Mass percentage of an additive FEC | Quantity of cycles completed when capacity retention is 80% (at 45° C.) | Quantity of cycles completed when capacity retention is 80% (at 25° C.) |
|---|---|---|---|---|---|---|
| Example 6 | 1.5 | 1.0 | 0.5 | 10% | 640 | 740 |
| Example 7 | 0.4 | 0.4 | 1.0 | 10% | 645 | 738 |
| Example 8 | 0.5 | 1.5 | 1.0 | 10% | 730 | 830 |
| Example 9 | 0.6 | 0.75 | 1.0 | 10% | 660 | 765 |
| Example 10 | 0.4 | 0.95 | 1.0 | 10% | 680 | 780 |

It can be learned from Examples 6 to 10 that cycling performance of the lithium-ion battery is relatively good when a total concentration of lithium fluorosulfonyl(trifluoromethanesulfonyl)imide, lithium dicyanamide, and lithium hexafluorophosphate contained in the electrolyte is 0.9 mol/L to 3.0 mol/L. Further, cycling performance of the lithium-ion battery is better when a total concentration of lithium fluorosulfonyl(trifluoromethanesulfonyl)imide and lithium hexafluorophosphate contained in the electrolyte is 0.8 mol/L to 2.0 mol/L. Therefore, cycling performance of the lithium-ion battery in Examples 7 to 10 is slightly better than cycling performance of the lithium-ion battery in Example 6. Further, cycling performance of the lithium-ion battery is better when a concentration of lithium hexafluorophosphate contained in the electrolyte is less than or equal to a concentration of lithium fluorosulfonyl(trifluoromethanesulfonyl)imide contained in the electrolyte (Examples 7 to 10).

Table 4 shows parameters and evaluation results in Examples 11 to 15 and Comparative Examples 4 and 5.

TABLE 4

| No. | Concentration of LiFTFSI (mol/L) | Concentration of LiDCA (mol/L) | Mass percentage of an additive FEC | Electrolyte viscosity (mPa · s) | Quantity of cycles completed when capacity retention is 80% (at 45° C.) | Quantity of cycles completed when capacity retention is 80% (at 25° C.) |
|---|---|---|---|---|---|---|
| Comparative Example 4 | 0.4 | 0.6 | 10% | 4.00 | 420 | 560 |
| Comparative Example 5 | 0.3 | 0.7 | 10% | 4.10 | 415 | 540 |
| Example 11 | 0.8 | 0.5 | 10% | 3.85 | 600 | 699 |
| Example 12 | 1.0 | 0.5 | 10% | 3.8 | 615 | 710 |
| Example 13 | 1.5 | 0.7 | 10% | 3.65 | 666 | 765 |
| Example 14 | 1.5 | 1.0 | 10% | 3.75 | 695 | 800 |
| Example 15 | 2.0 | 1.0 | 10% | 3.65 | 740 | 885 |

Through comparison between Comparative Examples 4 and 5 and Examples 11 to 15, it can be learned that when lithium fluorosulfonyl(trifluoromethanesulfonyl)imide and lithium dicyanamide exist as separate lithium salt, compared with Comparative Examples 4 and 5 in which a concentration of the lithium fluorosulfonyl(trifluoromethanesulfonyl) imide contained in the electrolyte is less than 0.8 mol/L, cycling performance of the lithium-ion battery is better when a total concentration of the lithium fluorosulfonyl (trifluoromethanesulfonyl)imide and the lithium dicyanamide contained in the electrolyte is 0.9 mol/L to 2.0 mol/L and a concentration of the lithium fluorosulfonyl(trifluoromethanesulfonyl)imide contained in the electrolyte is greater than or equal to 0.8 mol/L (Examples 11 to 15). In addition, with the increase of the concentration of the lithium fluorosulfonyl(trifluoromethanesulfonyl)imide contained in the electrolyte, cycling performance of the lithium-ion battery tends to improve. Adding the lithium dicyanamide can reduce viscosity of the electrolyte. Through comparison between Examples 11 to 15 and Comparative Examples 4 and 5, it can be learned that when the lithium dicyanamide is added, a high lithium salt concentration does not increase viscosity of the electrolyte, so that cycling performance is not affected.

Table 5 shows parameters and evaluation results in Examples 16 to 19 and Comparative Examples 6 and 7.

fluorosulfonyl(trifluoromethanesulfonyl)imide contained in the electrolyte is less than 0.8 mol/L, cycling performance of the lithium-ion battery is better when a concentration of the lithium fluorosulfonyl(trifluoromethanesulfonyl)imide contained in the electrolyte is greater than or equal to 0.8 mol/L (Examples 16 to 19). In addition, with the increase of the concentration of the lithium fluorosulfonyl(trifluoromethanesulfonyl)imide contained in the electrolyte, cycling performance of the lithium-ion battery tends to improve. In addition, when a mass percentage of a silicon element contained in a silicon-based material is relatively large (for example, greater than or equal to 40%), cycling performance of the lithium-ion battery is better when the concentration of the lithium fluorosulfonyl(trifluoromethanesulfonyl)imide contained in the electrolyte is greater than or equal to 1.1 mol/L.

Through comparison between Examples 5, 8, 13, and 14, it can be learned that when lithium fluorosulfonyl(trifluoromethanesulfonyl)imide and lithium dicyanamide exist as separate lithium salt, a molar concentration of the lithium dicyanamide is preferably less than or equal to 1.1 mol/L, and cycling performance of the lithium-ion battery is degraded when a molar concentration of the lithium dicyanamide is further greater than 1.1 mol/L.

The foregoing descriptions are merely examples of embodiments of this application and descriptions of applied

TABLE 5

| No. | Concentration of LiFTFSI (mol/L) | Concentration of LiDCA (mol/L) | Mass percentage of an additive FEC | Mass percentage of a silicon element contained in a silicon-based material | Quantity of cycles completed when capacity retention is 80% (at 45° C.) | Quantity of cycles completed when capacity retention is 80% (at 25° C.) |
|---|---|---|---|---|---|---|
| Comparative Example 6 | 0.4 | 0.4 | 10% | 10% | 415 | 550 |
| Comparative Example 7 | 0.6 | 0.3 | 10% | 40% | 470 | 590 |
| Example 16 | 0.8 | 0.4 | 10% | 10% | 590 | 650 |
| Example 17 | 1.0 | 0.4 | 10% | 10% | 605 | 700 |
| Example 18 | 1.3 | 0.2 | 10% | 40% | 635 | 732 |
| Example 19 | 1.6 | 0.3 | 10% | 40% | 680 | 777 |

It can be learned from Examples 16 to 19 and Comparative Examples 6 and 7 that when lithium fluorosulfonyl (trifluoromethanesulfonyl)imide and lithium dicyanamide exist as separate lithium salt, cycling performance of the lithium-ion battery is better when a total concentration of the lithium fluorosulfonyl(trifluoromethanesulfonyl)imide and the lithium dicyanamide contained in the electrolyte is 0.9 mol/L to 3.0 mol/L. Further, compared with Comparative Examples 6 and 7 in which a concentration of the lithium technical principles. A person skilled in the art should understand that the scope of disclosure in this application is not limited to the technical solutions formed by a specific combination of the foregoing technical features, and should also cover other technical solutions formed by any combination of the foregoing technical features or their equivalent features, for example, technical solutions formed by replacement between the foregoing features and technical features having similar functions disclosed in this application.

What is claimed is:

1. An electrolyte, comprising: a lithium salt, wherein the lithium salt comprises a fluorine-containing lithium salt and lithium dicyanamide, and the fluorine-containing lithium salt comprises lithium fluorosulfonyl(trifluoromethanesulfonyl)imide; wherein a molar concentration of the lithium dicyanamide contained in the electrolyte is 0.1 mol/L to 0.7 mol/L; wherein a total molar concentration of the fluorine-containing lithium salt and the lithium dicyanamide contained in the electrolyte is 0.9 mol/L to 3.0 mol/L;
wherein the electrolyte further comprises fluoroethylene carbonate with a mass percentage of 10%.

2. The electrolyte according to claim 1, wherein a molar concentration of the fluorine-containing lithium salt contained in the electrolyte is 0.8 mol/L to 2.0 mol/L.

3. The electrolyte according to claim 1, wherein a molar concentration of the lithium fluorosulfonyl(trifluoromethanesulfonyl)imide contained in the electrolyte is 1.5 mol/L to 2.0 mol/L.

4. The electrolyte according to claim 1, wherein the fluorine-containing lithium salt further comprises lithium hexafluorophosphate.

5. The electrolyte according to claim 4, wherein a molar concentration of the lithium fluorosulfonyl(trifluoromethanesulfonyl)imide contained in the electrolyte is greater than or equal to a molar concentration of the lithium hexafluorophosphate contained in the electrolyte.

6. An electrochemical apparatus, comprising: a positive electrode plate comprising a positive electrode active material; a negative electrode plate comprising a negative electrode active material; a separator disposed between the positive electrode plate and the negative electrode plate; and an electrolyte, wherein the electrolyte comprises a lithium salt, wherein the lithium salt comprises a fluorine-containing lithium salt and lithium dicyanamide, and the fluorine-containing lithium salt comprises lithium fluorosulfonyl(trifluoromethanesulfonyl)imide; wherein a molar concentration of the lithium dicyanamide contained in the electrolyte is 0.1 mol/L to 0.7 mol/L; wherein a total molar concentration of the fluorine-containing lithium salt and the lithium dicyanamide contained in the electrolyte is 0.9 mol/L to 3.0 mol/L; wherein the electrolyte further comprises fluoroethylene carbonate with a mass percentage of 10%.

7. The electrochemical apparatus to claim 6, wherein a molar concentration of the fluorine-containing lithium salt contained in the electrolyte is 0.8 mol/L to 2.0 mol/L.

8. The electrochemical apparatus to claim 6, wherein a molar concentration of the lithium fluorosulfonyl(trifluoromethanesulfonyl)imide contained in the electrolyte is 1.5 mol/L to 2.0 mol/L.

9. The electrochemical apparatus to claim 6, wherein the fluorine-containing lithium salt further comprises lithium hexafluorophosphate.

10. The electrochemical apparatus to claim 9, wherein a molar concentration of the lithium fluorosulfonyl(trifluoromethanesulfonyl)imide contained in the electrolyte is greater than or equal to a molar concentration of the lithium hexafluorophosphate contained in the electrolyte.

11. The electrochemical apparatus according to claim 6, wherein the negative electrode active material comprises at least one of a lithium metal or a silicon-based material, and the silicon-based material comprises at least one of silicon, a silicon-oxygen compound, a silicon-carbon compound, or a silicon alloy.

12. The electrochemical apparatus according to claim 11, wherein
a mass percentage of a silicon element contained in the silicon-based material is greater than or equal to 10%, and the molar concentration of lithium fluorosulfonyl(trifluoromethanesulfonyl)imide contained in the electrolyte is 0.8 mol/L to 2.0 mol/L; or
a mass percentage of a silicon element contained in the silicon-based material is greater than or equal to 40%, and a molar concentration of the lithium fluorosulfonyl(trifluoromethanesulfonyl)imide contained in the electrolyte is 1.1 mol/L to 2.0 mol/L.

13. An electronic apparatus, comprising an electrochemical apparatus, the electrochemical apparatus comprises: a positive electrode plate comprising a positive electrode active material; a negative electrode plate comprising a negative electrode active material; a separator disposed between the positive electrode plate and the negative electrode plate; and an electrolyte, wherein the electrolyte comprises a lithium salt, wherein the lithium salt comprises a fluorine-containing lithium salt and lithium dicyanamide, and the fluorine-containing lithium salt comprises lithium fluorosulfonyl(trifluoromethanesulfonyl)imide; wherein a molar concentration of the lithium dicyanamide contained in the electrolyte is 0.1 mol/L to 0.7 mol/L; wherein a total molar concentration of the fluorine-containing lithium salt and the lithium dicyanamide contained in the electrolyte is 0.9 mol/L to 3.0 mol/L; wherein the electrolyte further comprises fluoroethylene carbonate with a mass percentage of 10%.

14. The electronic apparatus according to claim 13, wherein the negative electrode active material comprises at least one of a lithium metal or a silicon-based material, and the silicon-based material comprises at least one of silicon, a silicon-oxygen compound, a silicon-carbon compound, or a silicon alloy.

15. The electronic apparatus according to claim 14, wherein a mass percentage of a silicon element contained in the silicon-based material is greater than or equal to 10%, and the molar concentration of lithium fluorosulfonyl(trifluoromethanesulfonyl)imide contained in the electrolyte is 0.8 mol/L to 2.0 mol/L; or
a mass percentage of a silicon element contained in the silicon-based material is greater than or equal to 40%, and a molar concentration of the lithium fluorosulfonyl(trifluoromethanesulfonyl)imide contained in the electrolyte is 1.1 mol/L to 2.0 mol/L.

* * * * *